(12) United States Patent
Gwon et al.

(10) Patent No.: US 11,021,130 B2
(45) Date of Patent: Jun. 1, 2021

(54) CURTAIN AIRBAG OF VEHICLE

(71) Applicant: AUTOLIV DEVELOPMENT AB, Vårgårda (SE)

(72) Inventors: Tae Ik Gwon, Hwaseong-si (KR); Kyu Soung Jang, Hwaseong-si (KR); Wan Dong Yoo, Hwaseong-si (KR); Yong Hyun Jung, Hwaseong-si (KR); Hugh Finn, Congleton (GB); Gary Wootton, Congleton (GB); Dae Chang Jung, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 172 days.

(21) Appl. No.: 16/320,842

(22) PCT Filed: Jul. 26, 2017

(86) PCT No.: PCT/KR2017/008059
§ 371 (c)(1),
(2) Date: Jan. 25, 2019

(87) PCT Pub. No.: WO2018/021831
PCT Pub. Date: Feb. 1, 2018

(65) Prior Publication Data
US 2019/0161051 A1    May 30, 2019

(30) Foreign Application Priority Data

Jul. 27, 2016  (KR) .......................... 10-2016-0095681
Aug. 12, 2016  (KR) .......................... 10-2016-0103219

(51) Int. Cl.
*B60R 21/232* (2011.01)
*B60R 21/2338* (2011.01)
(Continued)

(52) U.S. Cl.
CPC .......... *B60R 21/232* (2013.01); *B60R 21/213* (2013.01); *B60R 21/235* (2013.01);
(Continued)

(58) Field of Classification Search
CPC . B60R 21/232; B60R 21/235; B60R 21/2338; B60R 21/213; B60R 2021/23382; B60R 2021/23547
See application file for complete search history.

(56) References Cited

U.S. PATENT DOCUMENTS 6,073,960 A  *  6/2000  Viano ................... B60R 21/231
                                                        280/730.1
8,267,424 B2     9/2012  Tomitaka et al.
(Continued)

FOREIGN PATENT DOCUMENTS

CN      103448660 A    12/2013
JP      H10138860 A    5/1998
(Continued)

OTHER PUBLICATIONS

International Search Report (in English and Korean) and Written Opinion (in Korean) issued in PCT/KR2017/008059, dated Nov. 29, 2017; ISA/KR.

*Primary Examiner* — Toan C To
(74) *Attorney, Agent, or Firm* — Stephen T. Olson; Harness, Dickey & Pierce, P.L.C.

(57) ABSTRACT

A curtain airbag of a vehicle is provided adjacent to the roof of the vehicle in a folded state, is configured to have a shape that unfolds downward between an inner side surface of the vehicle and an occupant when the vehicle crashes, and includes an outer panel that proceeds toward the side surface of the vehicle and an inner panel that proceeds toward the occupant upon expansion. The curtain airbag further includes a head support part configured to have a shape in which an expansion thickness, which is defined by the outer (Continued)

panel and the inner panel in a portion that the head of the occupant contacts due to the car crash, gradually increases toward the front of the vehicle, so as to prevent the head of the occupant from rotating while moving toward the front of the vehicle. The curtain airbag may effectively stop the head of the occupant from rotating while moving toward the front of the vehicle during a vehicle crash.

19 Claims, 13 Drawing Sheets

(51) Int. Cl.
  *B60R 21/235* (2006.01)
  *B60R 21/213* (2011.01)
(52) U.S. Cl.
  CPC .............. *B60R 21/2338* (2013.01); *B60R 2021/23382* (2013.01); *B60R 2021/23547* (2013.01)

(56) References Cited

U.S. PATENT DOCUMENTS

| | | | |
|---|---|---|---|
| 9,994,185 B2* | 6/2018 | Deng | B60R 21/2338 |
| 2010/0264631 A1 | 10/2010 | Tomitaka et al. | |
| 2013/0270805 A1* | 10/2013 | Kruse | B60R 21/2338 |
| | | | 280/730.2 |
| 2014/0203541 A1* | 7/2014 | Wei | B60R 21/233 |
| | | | 280/730.2 |
| 2016/0001732 A1 | 1/2016 | Asada et al. | |
| 2016/0229370 A1 | 8/2016 | Hampson et al. | |
| 2018/0079382 A1* | 3/2018 | Yoo | B60R 21/203 |
| 2018/0126944 A1* | 5/2018 | Choi | B60R 21/215 |
| 2018/0354448 A1* | 12/2018 | Moon | B60R 21/232 |
| 2019/0106076 A1* | 4/2019 | Shin | B60R 21/23138 |

FOREIGN PATENT DOCUMENTS

| | | | |
|---|---|---|---|
| JP | 2007083835 A | 4/2007 | |
| JP | 2010143232 A | 7/2010 | |

\* cited by examiner

CURTAIN AIRBAG OF VEHICLE

CROSS-REFERENCE TO RELATED APPLICATIONS

This application is a 371 U.S. National Stage of International Application No. PCT/KR2017/008059, filed Jul. 26, 2017, which claims priority to Korean Patent Application No. 10-2016-0095681, filed Jul. 27, 2016 and 10-2016-0103219, filed Aug. 12, 2016. The disclosures of the above applications are incorporated herein by reference.

TECHNICAL FIELD

The present invention relates to a safety apparatus of a vehicle, and more particularly, to a curtain airbag of a vehicle, which is inflated between an occupant and an inner lateral side of the vehicle to protect the occupant upon a collision of the vehicle.

BACKGROUND ART

In general, an airbag apparatus of a vehicle refers to a safety apparatus for protecting an occupant by rapidly inflating an airbag by injecting gas into the airbag in response to a signal from an impact sensor upon collision of the vehicle, and the airbag apparatus is installed inside a trim of the vehicle so as not to be seen during normal operation.

Airbag systems have also been developed to provide similar protection between an interior side of the vehicle and the occupant to protect the vehicle against side impact. The above situation occurs when a side of the vehicle is crashed by another vehicle or when there is a rollover in which the side of the vehicle repeatedly crashes on the ground. A side impact airbag is often referred to as an inflatable curtain airbag.

Since the occupant in the vehicle may be in any position among various positions in the vehicle when the airbag is deployed, it is desirable to provide an airbag system that provides protection against an impact over an occupant position in a wide range as possible.

For example, in the case of a rollover collision, it is difficult to predict a posture and a trajectory of the occupant in the vehicle. Accordingly, the known curtain airbags designed for protection against a pure side collision may not be in a proper position. As a result, although the airbag system is deployed, there may be a risk of injury due to collision with an interior surface of the vehicle or the occupant may be ejected from the vehicle.

In addition, there has been needs for enforced protection upon "small overlap" and "oblique" collisions as one requirement for stability which is recently clarified. The small overlap collision is a front collision occurring at a relatively narrow portion in a left or right front of a vehicle. The oblique collision refers to a front collision occurring at a relatively narrow portion in a left or right front of the vehicle, in which an angular impact is applied onto the front of the vehicle.

The above collisions may cause a large deformation of the vehicle structure on a side portion where the impact occurs. In addition, since the above collisions tend to cause a center of the vehicle to rotate and deviate from a moving line, and thus a trajectory of the occupant inside the vehicle may be different from the design of the airbag system for protection, the protection may be insufficiently provided against the small overlap and oblique collisions. For example, upon vehicular collision, a head of the occupant may forwardly move with a vector having front and lateral factors, and rotate about an axis along the vertical direction of the vehicle. The above tendency may increase a brain injury criteria of the occupant.

When the various side collisions occur as described above, the head of the occupant may forwardly move with a vector having forward and lateral factors, and may rotate about the vertical axis of the vehicle or rotate around a transverse axis of the vehicle. Since the above vertical axial rotation of the occupant head is a powerful factor for the brain injury criteria (BrIC), an effective solution against the problem has been required.

DISCLOSURE

Technical Problem

The present invention provides a curtain airbag of a vehicle to prevent a head of an occupant from colliding with an airbag and rotating while moving toward a front and an outer side a vehicle upon collision of the vehicle.

Technical Solution

To achieve the above-mentioned object, the curtain airbag of the vehicle according to the present invention is provided in a folded state adjacent to a roof of the vehicle and deployed downward between an inner lateral side of the vehicle and an occupant upon collision of the vehicle, and includes an outer panel and an inner panel directed to a lateral side of the vehicle and the occupant, respectively, when inflated; and a head blocking part having an expansion thickness defined by the outer panel and the inner panel and configured to gradually increase toward a front of the vehicle at a portion which comes into contact with a head of the occupant upon the collision of the vehicle, to prevent the head of the occupant from rotatably moving toward the front of the vehicle.

The curtain airbag of the vehicle according to the present invention is provided in a folded state adjacent to a roof of the vehicle and deployed downward between an inner lateral side of the vehicle and an occupant upon collision of the vehicle, and includes an outer panel and an inner panel directed to a lateral side of the vehicle and the occupant, respectively, when deployed; and a thickness adjustment unit provided between the inner panel and the outer panel to adjust an inflation thickness which is formed in an upper-lower direction and a width direction of the vehicle such that a head of the occupant is prevented from moving toward a front portion of the vehicle and prevented from rotating about an upper-lower axis and a width axis of the vehicle when the head of the occupant collides with a portion of the inner panel due to the collision of the vehicle.

Advantageous Effects

As mentioned above, according to the curtain airbag of the vehicle of the present invention, the expansion thickness at a portion in which the head of the occupant hits on the curtain airbag upon the collision of the vehicle is configured to gradually increase toward a front of the vehicle to prevent the head of the occupant from rotating about a vertical center axis of the vehicle while moving toward the front of the vehicle, so that a brain injury criteria of the occupant can be effectively reduced.

In addition, according to the present invention, upon vehicular collision, an expansion thickness at a portion, with which the occupant's head hits, of the curtain airbag configured to gradually increase toward an upper portion of the vehicle, thereby preventing the X-axis rotation of the occupant's head, so that the brain injury criteria can be effectively reduced.

In addition, according to the present invention, an expansion thickness at a front of an anti-X-axis rotation region is configured to be greater than an expansion thickness of the anti-X-axis rotation region, so that the X-axis rotation and the Z-axis rotation of the occupant's head can be simultaneously prevented.

In addition, according to the present invention, upon vehicular collision, an expansion thickness at a portion, with which the occupant's head hits, of the curtain airbag configured to gradually increase toward an upper portion of the vehicle, and increase toward a front portion of the vehicle, thereby simultaneously preventing the X-axis rotation and the Z-axis rotation of the occupant's head, so that the brain injury criteria can be effectively reduced.

BEST MODE

Mode for Invention

Figure 1:
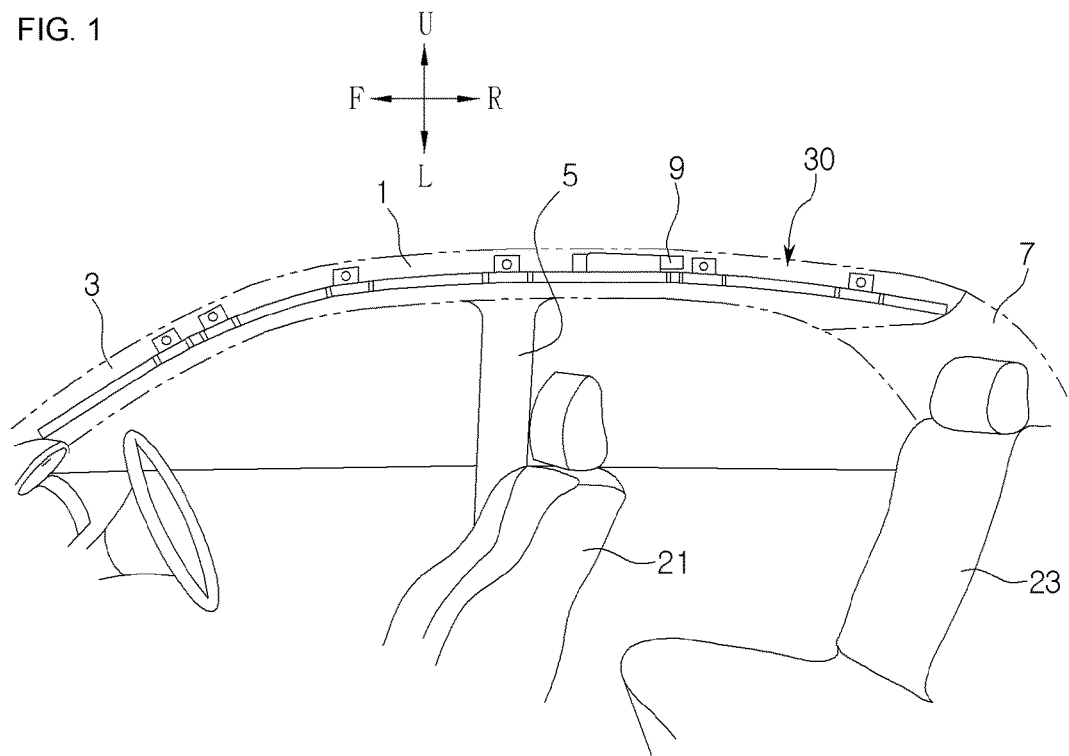
FIG. 1 is a view showing a configuration of a curtain airbag stored in a structure of a vehicle according to a first embodiment of the present invention.

Hereinafter, embodiments of the present invention will be described in detail with reference to the accompanying drawings. However, the present invention is not limited to the embodiments disclosed as below and it may be implemented in various different forms. The embodiments are provided to complete the disclosure of the present invention and are provided to fully disclose the scope of the invention to those having ordinary skills in the art.

Hereinafter, a reference numeral F denotes a front of a vehicle provided with a curtain airbag of the present invention, the reference numeral R denotes a rear of the vehicle, the reference numeral U denotes an upper portion of the vehicle, and the reference numeral L denotes a lower portion of the vehicle. The reference numeral I denotes an inward direction of the vehicle in the width direction of the vehicle, and the reference numeral O denotes an outward direction of the vehicle in the width direction of the vehicle. Front and rear directions F and R of the vehicle may be expressed in the horizontal direction, and up and down directions U and L of the vehicle may be expressed in the vertical direction.

First Embodiment

Figure 2:
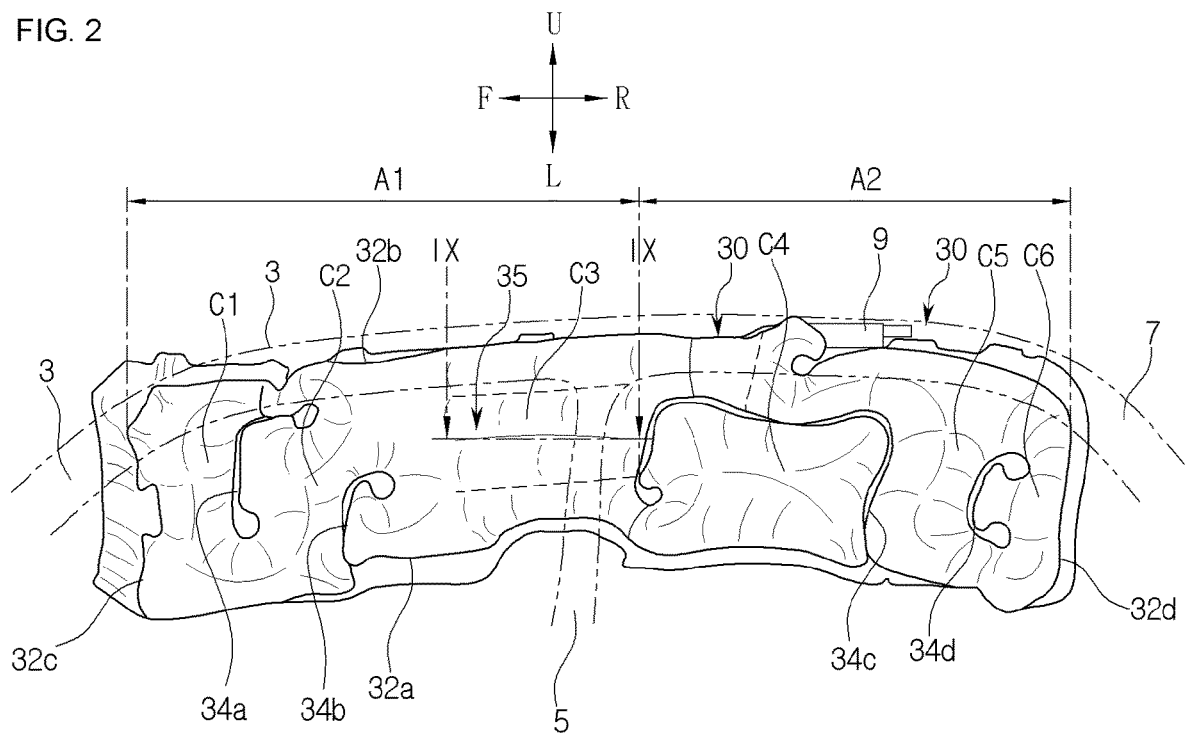
FIG. 2 is a view showing a configuration of an inflated curtain airbag according to the present invention.

FIG. 1 is a view showing a configuration of a curtain airbag stored in a structure of a vehicle according to a first embodiment of the present invention, and FIG. 2 is a view showing a configuration of an inflated curtain airbag according to the present invention.

Referring to FIGS. 1 and 2, the curtain airbag 30 is mounted to be folded or coiled in a roof side rail 1 of the vehicle. In general, the roof side rail 1 is covered by a roof trim and is not visible from the inside of the vehicle.

A plurality of pillar for supporting a roof are connected to the roof side rail 1. The above pillars are referred to as a front pillar 3, a center pillar 5, and a rear pillar 7 sequentially from the front of the vehicle. The pillar may include an additional pillar (so-called "D-pillar") in a rear side of the rear pillar 7 if needed.

The curtain airbag 30 is formed into a bag shape by a sewing or a one-piece woven scheme between an outer panel 31 and an inner panel 33, which will be described later.

The curtain airbag 30 is connected to an inflator 9 for generating gas. When a side collision or a rollover occurs on the vehicle, first, a sensor (not shown) provided in the vehicle senses an impact, and an ignition signal is transmitted to the inflator 9. A combustible material in the inflator 9 is ignited to generate gas, and the gas generated from the inflator 9 is supplied into the curtain airbag 30.

When receiving the gas from the inflator 9, the curtain airbag 30 is inflated and downwardly deployed along an inner side surface of the vehicle to protect the occupant. The curtain airbag 30 may simultaneously protect the occupants of a front seat 21 and a rear seat 23.

The curtain airbag 30, when inflated, may have a front protection region A1 and a rear protection region A2. The front protection region A1 may entirely cover side surfaces of the vehicle in the range from the front pillar 3 to the center pillar 5 of the vehicle, and the rear protection region A2 may entirely cover side surfaces of the vehicle in the range from the center pillar 5 to the rear pillar 7 of the vehicle.

The curtain airbag 30 has a bag shape that defines an inflatable space therein by front and rear walls 32c and 32d and upper and lower walls 32b and 32a.

A plurality of front chambers C1, C2 and C3 are defined by chamber walls 34a and 34b in the front protection region A1 of the curtain airbag 30, and a plurality of rear chambers C4, C5 and C6 are defined by chamber walls 34c and 34d in the rear protection region A2.

Upon collision, such as a side collision, of the vehicle, the front chamber C3 substantially comes into contact with the head of the passenger seated on the front seat 21. Hereinafter, the portion corresponding to the front chamber C3 will be referred to as a head blocking part 35.

The upper, lower, front and rear walls 32b, 32a, 32c and 32d and the chamber walls 34a, 34b, 34c and 34d described above may be formed by a sewing or a one-piece woven scheme between the inner and outer panels 33 and 31 of the curtain airbag 30. In another embodiment, the upper, lower, front and rear walls 32b, 32a, 32c and 32d and the chamber walls 34a, 34b, 34c and 34d may be formed by various suitable schemes such as adhesive, RF welding, and ultrasonic welding.

The chamber wall 34c may be formed to communicate a lower portion of the chamber C3 with the chamber C4, such that the chamber wall 34c is relatively delayed for expansion in comparison with other chambers including the chamber C3.

Figure 3:
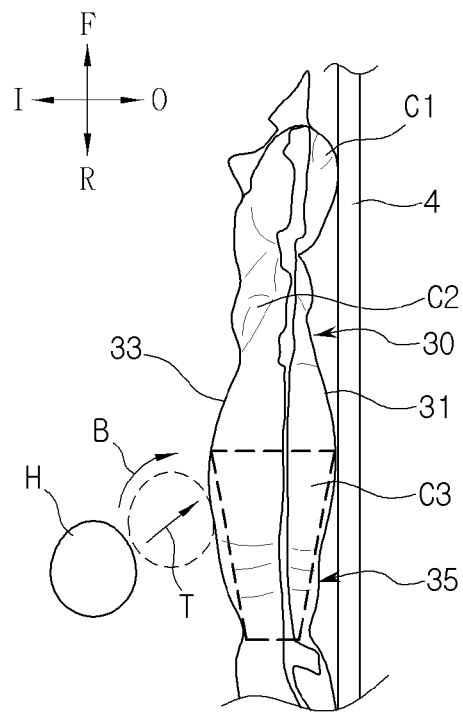
FIG. 3 is a partial plan view of a curtain airbag of FIG. 2.

FIG. 3 is a partial plan view of a curtain airbag of FIG. 2.

FIG. 3 shows a front-outer trajectory T of the occupant's head H relative to the vehicle. The front-outer trajectory T is a trajectory in which the occupant's head H moves toward the front and the outside of the vehicle upon the collision of the vehicle, and the trajectory shows that the occupant's head H moves along a solid line upon the side collision. The side collision may include various collision scenarios such as oblique side collision, rectangular side collision, column side collision, and oblique column side collision.

In some cases, the above-mentioned front-outer trajectory T may also occur at the time of a small overlap collision or an oblique collision of the vehicle.

Accordingly, when the occupant's head H moves along the front-outer trajectory T due to the collision of the vehicle, the occupant's head H moves toward the front of the vehicle while coming into contact with the curtain airbag 30. At this time, the occupant's head H rotates in the clockwise direction (arrow B) about the vertical axis (Z-axis) of the vehicle due to friction between the occupant's head H and the curtain airbag 30.

The Z-axis rotation of the occupant's head H exerts a significant effect on the brain injury criteria (BrIC). According to the present invention, when the vehicle collides, the expansion thickness of the head blocking part 35 of the curtain airbag 30, which the occupant's head H is hit on, is configured to gradually increase toward the front F of the vehicle. According to the above configuration, the occupant's head H is blocked from rotating in the direction of the arrow B while moving toward the front F of the vehicle, so that a brain injury criteria of the occupant is effectively reduced.

Figure 4:
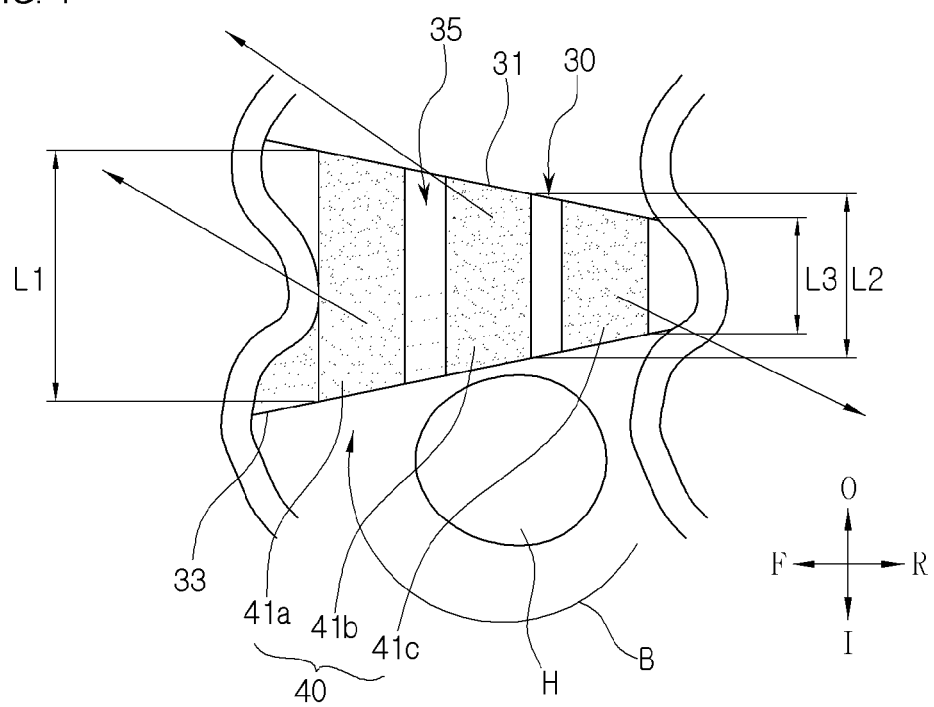
FIG. 4 is a cross-sectional view taken along line IX-IX of FIG. 2.

FIG. 4 is a cross-sectional view taken along line IX-IX of FIG. 2.

Referring to FIG. 4, a cross-section of the head blocking part 35 of the curtain airbag 30 is defined as an approximately irregular quadrilateral by the expansion thickness restriction member 40.

The expansion thickness restriction member 40 may include inner tether parts 41a, 41b and 41c provided between the outer panel 31 and the inner panel 33 of the curtain airbag 30. The inner tether parts 41a, 41b and 41c, when the inner panel 33 and the outer panel 31 are manufactured, may be woven together with the inner and outer panels 33 and 31 by a one-piece woven scheme.

In other words, the inner tether parts 41a, 41b and 41c are formed integrally with the inner panel 33 and the outer panel 31. The inner tether parts 41a, 41b and 41c may be integrally formed with the inner and outer panels 33 and 31 by using warps or wefts during weaving the inner and outer panels 33 and 31, or may be integrally formed with the inner and outer panels 33 and 31 by applying additional yarns to the warps or wefts constituting the inner and outer panels 33 and 31.

A length L1 of the inner tether part 41a is greater than a length L2 of the inner tether part 41b, and a length L3 of the inner tether part 41c is smaller than the length L2 of the inner tether part 41b. According to the above configuration, the cross-sectional expansion thickness of the head blocking part 35 may be formed in a substantially irregular rectangular shape.

Figure 5:
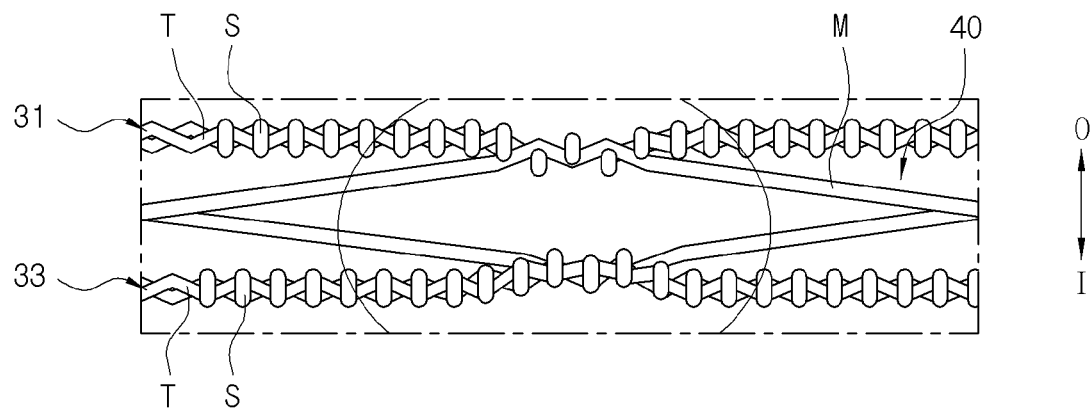
FIG. 5 is a view showing one manner in which an inner tether is integrally formed between an inner panel and an outer panel.

FIG. 5 is a view showing one manner in which the inner tether is integrally formed between the inner panel and the outer panel.

Referring to FIGS. 4 and 5, the inner panel 33 constitutes a woven layer formed by warps T and wefts S, and the outer panel 31 constitutes a woven layer formed by warps T and wefts S. The additional grey yarns M are woven by a predetermined distance into the inner panel 33 along the warps T or wefts S direction of the inner panel 33, and woven into the outer panel 31 by a predetermined distance along the warps T or wefts S direction after extending to the outer panel 31. After the above process is repeated, the inner tether parts 41a, 41b and 41c are integrally woven between the inner and outer panels 33 and 31. FIG. 5 shows that the gey yarns M are woven in the warps T direction.

Figure 6:
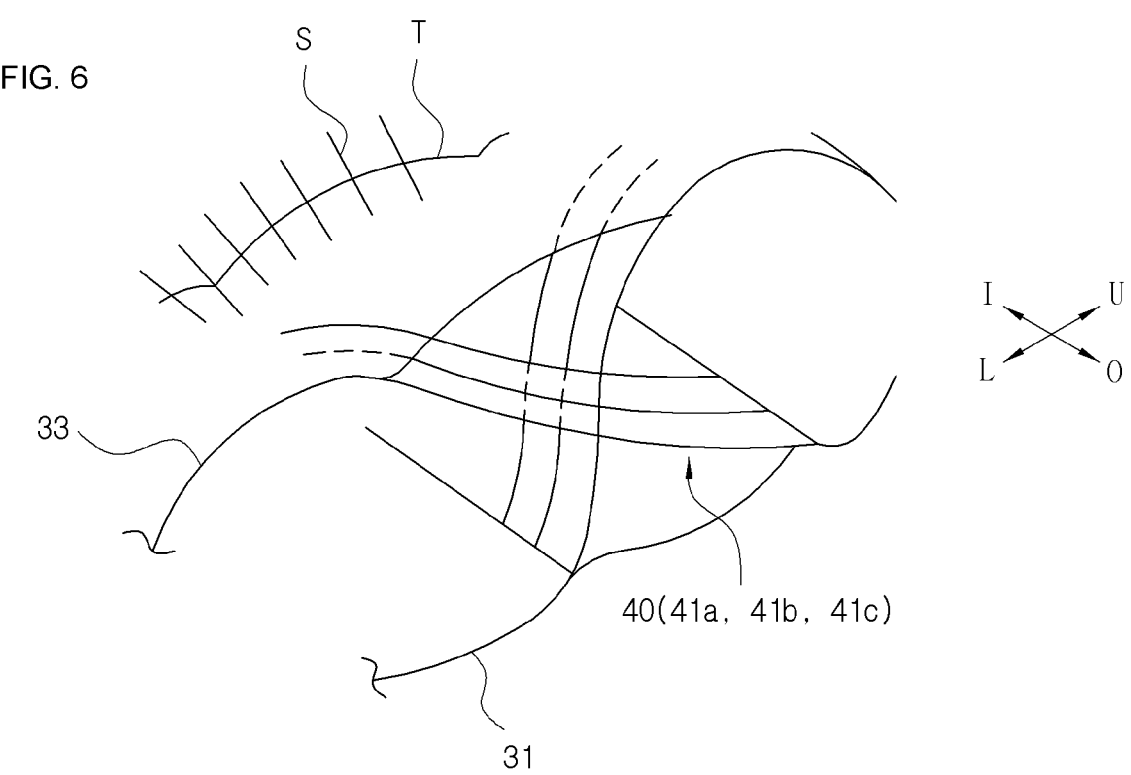
FIG. 6 is a partial cross-sectional view of a curtain airbag provided with an inner tether part defining a head blocking part according to the present invention.

FIG. 6 is a partial cross-sectional view of the curtain airbag provided with the inner tether part defining the head blocking part according to the present invention.

Referring to FIGS. 4 and 6, the warps T and the wefts S leave a surface region formed by the inner panel 11, grow toward the outer panel 31, and are connected to the warps or wefts constituting the outer panel 13, so that the inner tether parts 41a, 41b and 41c may be integrally formed with the inner and outer panels 33 and 31. The above drawing shows that the warps T of the inner tether parts 41a, 41b and 41c leave the surface of the inner panel 33 and enter the outer panel 31.

The inner tether parts 41a, 41b and 41c may be integrally formed with the inner and outer panels 33 and 31 between the inner and outer panels 33 and 31 by various weaving schemes other than the above-described scheme.

Figure 7:
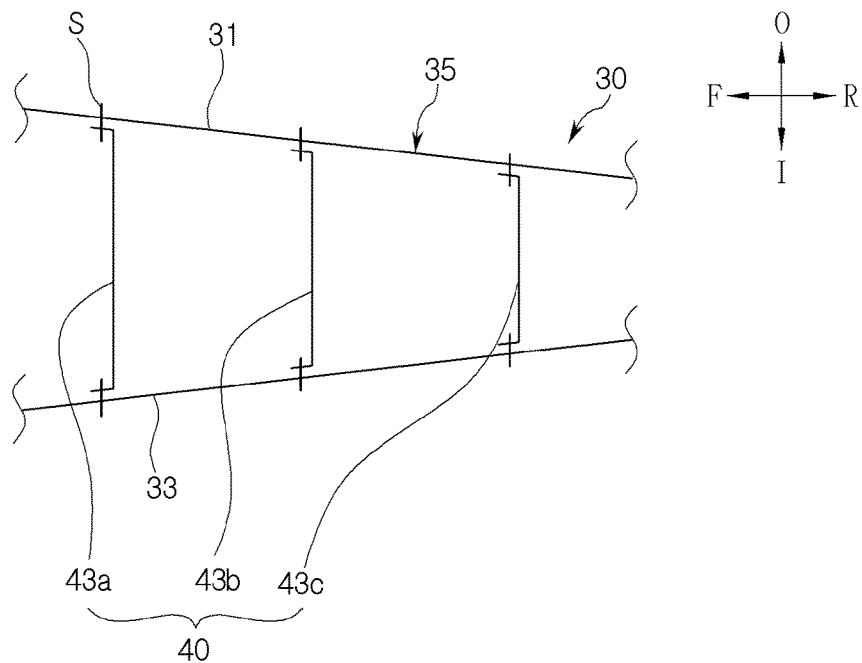
FIG. 7 is a partial cross-sectional view of a curtain airbag provided with a separate tether member defining a head blocking part according to the present invention.

FIG. 7 is a partial cross-sectional view of the curtain airbag provided with a separate tether member defining the head blocking part according to the present invention.

Referring to FIG. 7, the expansion thickness restriction member 40 of the head blocking part 35 includes tether members 43a, 43b and 43c connected between the outer panel 31 and the inner panel 33 of the curtain airbag 30. The tether members 43a, 43b and 43c may be provided as separate members from the outer panel 31 and the inner panel 33 of the curtain airbag 30 so as to be connected to the outer panel 31 and the inner panel 33 via, for example, a sewing line S.

The tether members 43a, 43b and 43c are configured to have a length gradually increasing toward the front F, so that the expansion thickness between the inner and outer panels 33 and 31 of the curtain airbag 30 is defined to increase toward the front F.

Figure 8:
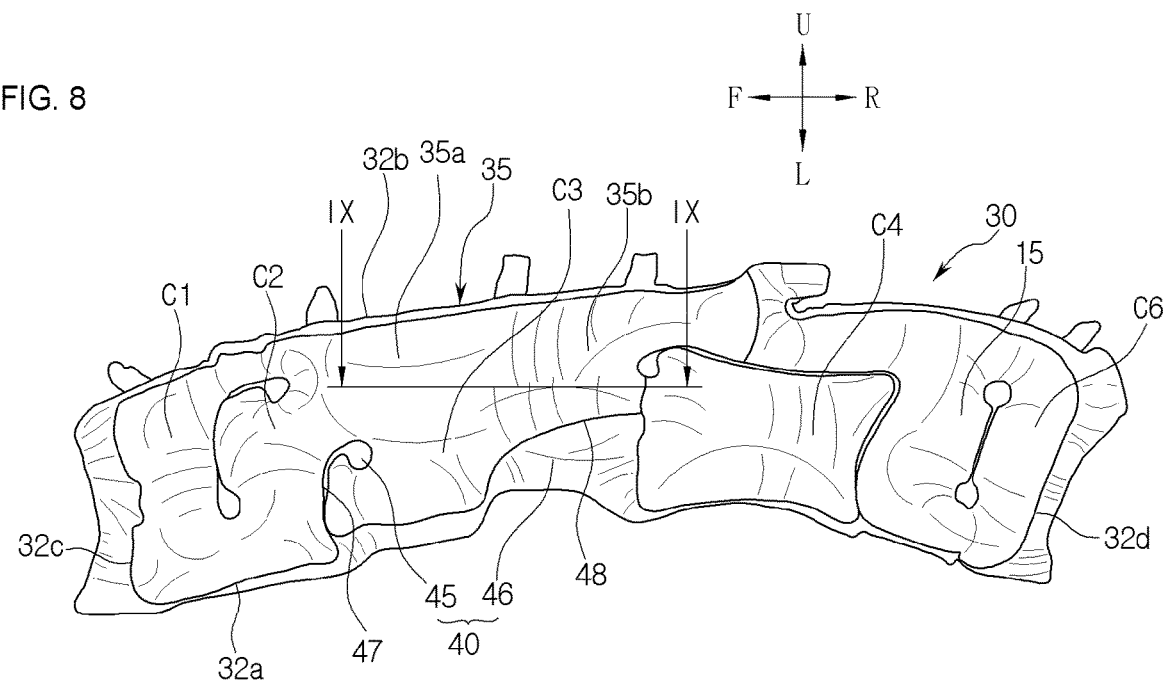
FIG. 8 is a view showing a configuration of another inflated curtain airbag according to the present invention.
Figure 9:
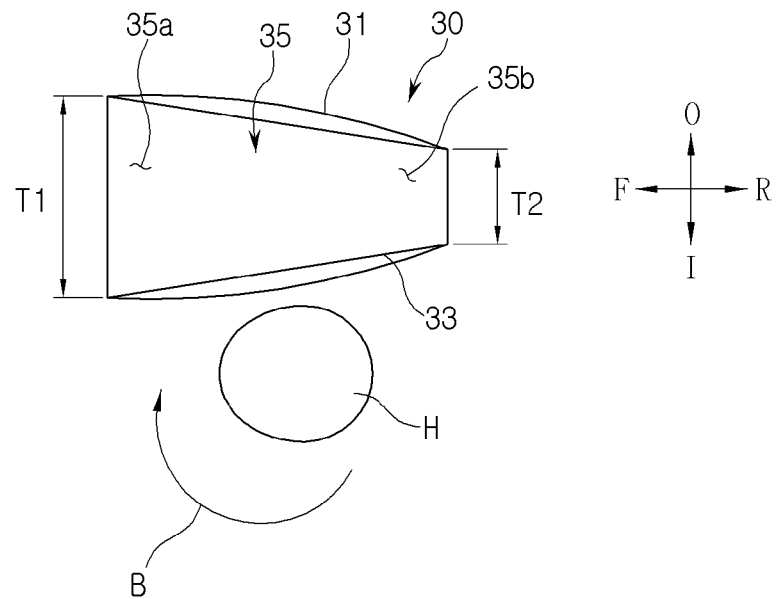
FIG. 9 is a cross-sectional view taken along line IX-IX of FIG. 8

FIG. 8 is a view showing a configuration of another inflated curtain airbag according to the present invention, and FIG. 9 is a cross-sectional view taken along line IX-IX of FIG. 8

Hereinafter, the same reference numerals are used for the same components as those described above, and duplicate descriptions are omitted.

Referring to FIGS. 8 and 9, the expansion thickness restriction member 40 of the head blocking part 35 of the curtain airbag 30 may include non-expansion regions 45 and 46 in which an expansion volume of a front portion 35a of the head blocking part 35 is defined to be greater than an expansion volume of a rear portion 35b of the head blocking part 35.

The non-expansion regions 45 and 46 may be defined by the sewing line connecting the outer panel 31 and the inner panel 33. In another embodiment, the non-expansion regions 45 and 46 may be formed by the one-piece woven scheme. In still another embodiment, the upper, lower, front and rear walls 32b, 32a, 32c, and 32d and the chamber walls 34a, 34b, 34c and 34d may be formed by various suitable schemes such as adhesive, RF welding, ultrasonic welding.

The sewing line defining the non-expansion regions 45 and 46 may include a front sewing line 47 protruding from the lower wall 32 of the curtain airbag 30 to an upper portion of the curtain airbag 30, and a rear sewing line 48 inclined rearward R and upward U of the curtain airbag 30 from one position of the lower portion of the curtain airbag 30, which is away rearward from the front sewing line 47 by a predetermined distance, to reach a middle portion along a vertical direction of the curtain airbag 30.

According to the above configuration, the expansion thickness T1 of the front portion 35a of the head blocking part 35 is defined to be larger than the expansion thickness T2 of the rear portion 35b of the head blocking part 35. As a result, a cross-section of the head blocking part 35 may have a substantially irregular rectangular shape. Accordingly, it may be effectively prevented that the occupant's head hits the curtain airbag 30 while moving toward the front F of the vehicle, and the occupant's head from rotating about the vertical axis of the vehicle due to friction between the curtain airbag 30 and the occupant's head, due to collision, such as side collision of the vehicle. The position and shape of the sewing line are not limited to the above-described examples and may be modified variously. FIG. 8 shows that the rear sewing line 48 is curved in a circular arc shape. However, the shape of the rear sewing line 48 is not limited thereto and may have various forms.

Figure 10:
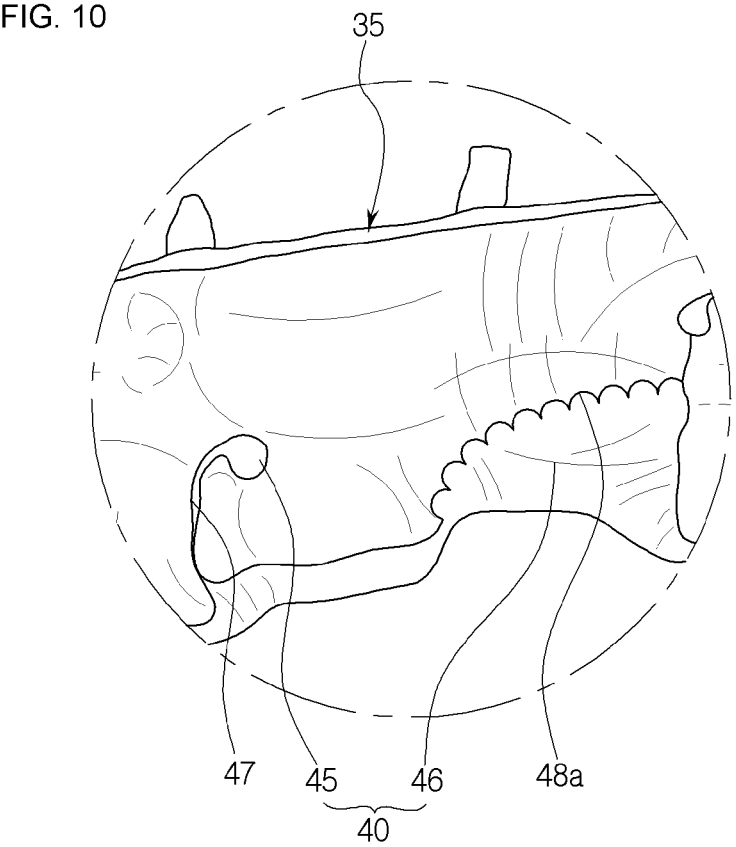
FIG. 10 is a partial side view showing a construction of a curtain airbag having a rear sewing line according to another embodiment of the present invention.
Figure 11:
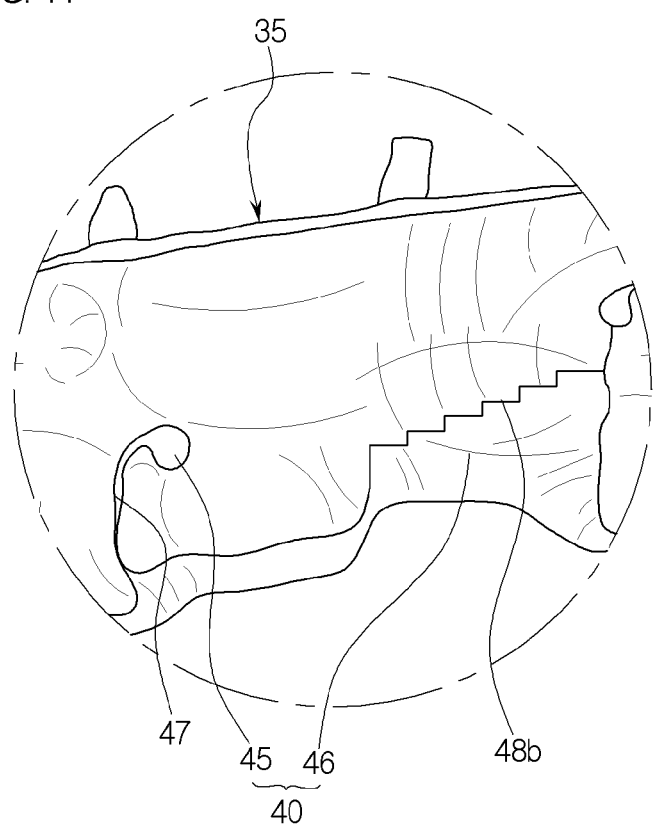
FIG. 11 is a partial side view showing a construction of a curtain airbag having a rear sewing line according to another embodiment of the present invention.

FIG. 10 is a partial side view showing a construction of a curtain airbag having a rear sewing line according to another embodiment of the present invention. FIG. 11 is a partial side view showing a construction of a curtain airbag having a rear sewing line according to another embodiment of the present invention.

FIG. 10 shows a curtain airbag 30 provided with a rear sewing line 48a having a substantially wavy shape, and FIG. 11 shows a curtain airbag 30 provided with a rear sewing line 48b having a substantially stepped shape.

Accordingly, the wavy rear sewing line 48a and the stepped rear sewing line 48b may relatively elongate a length of the sewing line, for example, in a predetermined limited section, so that binding force between the inner and outer panels 33 and 31 of the curtain airbag 30 may be increased.

Meanwhile, when the wavy or stepped shape is largely defined, the curtain airbag is inflated in an irregular shape, thereby improving the effect of preventing the occupant's head from rotating about the vertical axis of the vehicle while moving toward the front of the vehicle.

Second Embodiment

Figure 12:
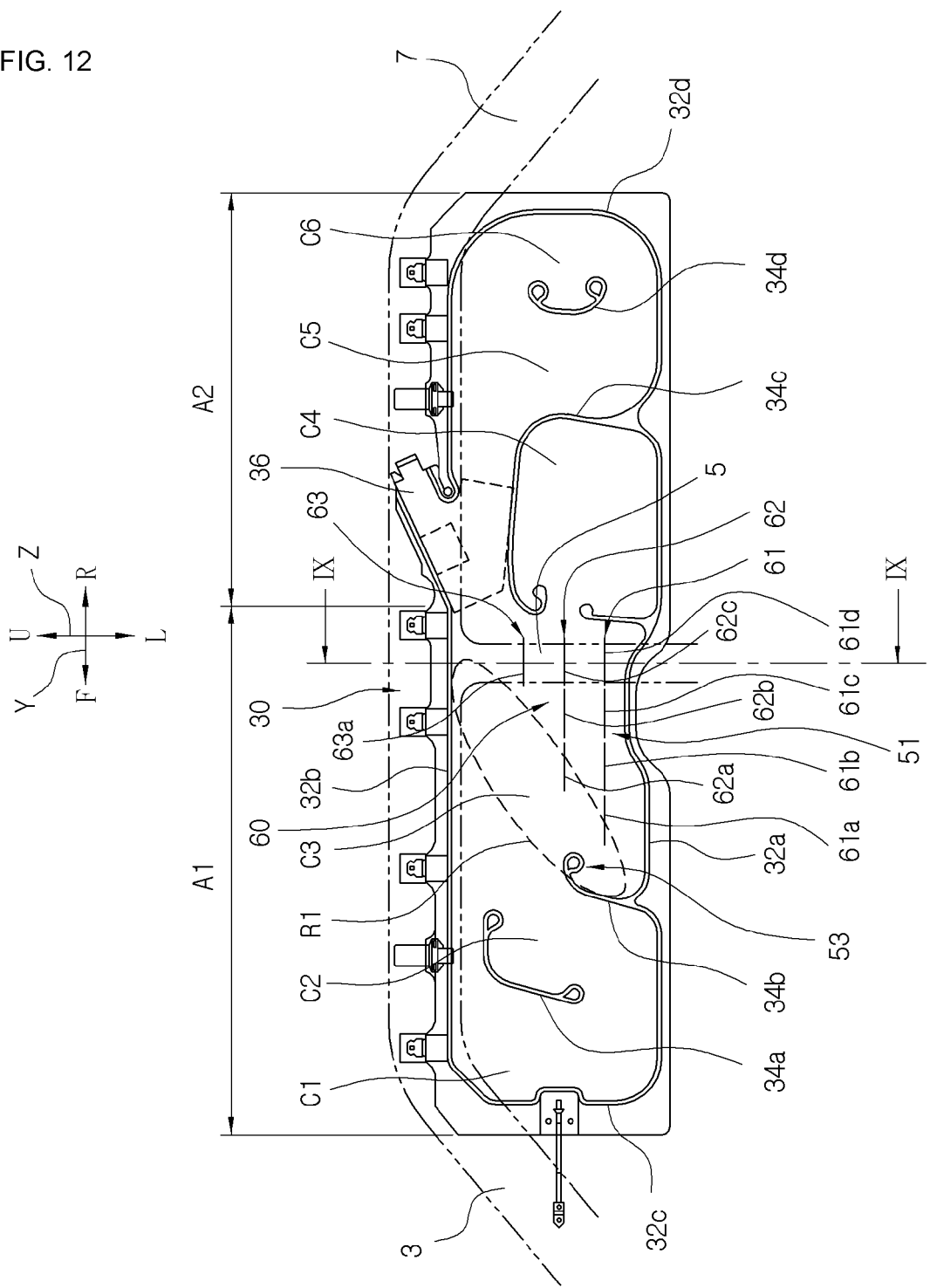
FIG. 12 is a view showing a configuration of an inflated curtain airbag according to a second embodiment of the present invention.
Figure 13:
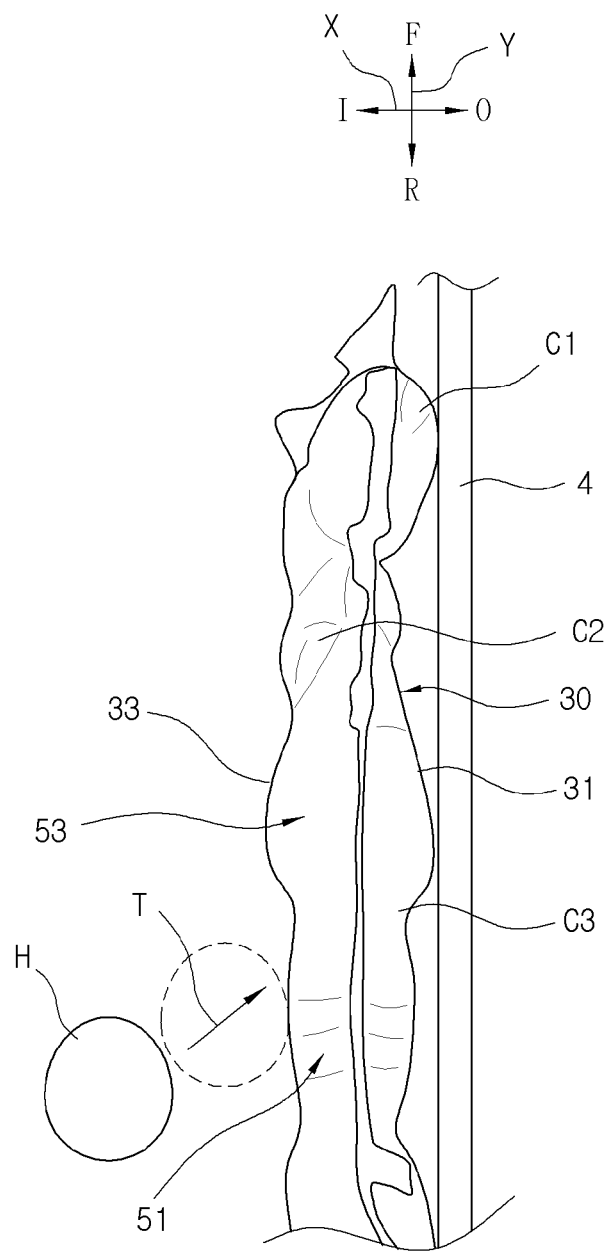
FIG. 13 is a partial plan view of a curtain airbag of FIG. 12.

FIG. 12 is a view showing a configuration of an inflated curtain airbag according to a second embodiment of the present invention, and FIG. 13 is a partial plan view of a curtain airbag of FIG. 12.

According to a second embodiment of the present invention, as shown in FIGS. 12 and 13, a portion, such as the front chamber C3, with which the occupant's head comes into contact upon vehicular collision includes: an anti-width-axis rotation region (hereinafter, referred to as an anti-X-axis rotation region) for preventing the occupant's head from rotating about the width axis (X-axis) of the vehicle, and an anti-upper-lower-axis rotation region 53 (hereinafter, referred to as an anti-Z-axis rotation region) for preventing the occupant's head from rotating about the vertical axis (Z-axis) of the vehicle.

An expansion thickness of the anti-X-axis rotation region 51 is gradually greater toward the upper portion U of the vehicle. The anti-Z-axis rotation region 53 is arranged to be inclined upward from the front of the anti-X-axis rotation region 51 toward the rear R of the vehicle, and has an expansion thickness greater than the anti-X-axis rotation region 51.

FIG. 13 shows the front-outer trajectory T of the occupant's head H relative to the vehicle. The front-outer trajectory T is a trajectory in which the occupant's head H moves toward the front and the outside of the vehicle upon collision of the vehicle, and the trajectory shows that the occupant's head H moves along a solid line upon side collision. The side collision may include various collision scenarios such as oblique side collision, rectangular side collision, column side collision, and oblique column side collision. In some cases, the above-mentioned front-outer trajectory T may also occur at the time of a small overlap collision or an oblique collision of the vehicle.

Accordingly, when the occupant's head H moves along the front-outer trajectory T due to the collision of the vehicle, the occupant's head H moves toward the front of the vehicle while coming into contact with the curtain airbag 30. At this time, the occupant's head H may rotate about the X, Y and Z axes of the vehicle due to the friction between the occupant's head H and the curtain airbag 30.

The rotation of the occupant's head H exerts a significant effect on the brain injury criteria (BrIC).

The present invention proposes embodiments to effectively reduce the rotation of the occupant's head, especially, the X-axis rotation and the Z-axis rotation.

As shown in FIGS. 12 and 13, according to a second embodiment of the present invention, when the occupant's head H on the curtain airbag 30 is substantially hit on the inner panel 33 of the front chamber C3 while moving toward the front F of the vehicle upon the vehicular collision, the ant-X-axis rotation region 51 blocks the occupant's head H from rotating about the X-axis, and the ant-Z-axis rotation region 53 arranged the front of the ant-X-axis rotation region 51 blocks the occupant's head H from rotating about the Z-axis, so that the brain injury criteria of the occupant may be reduced.

Figure 14:
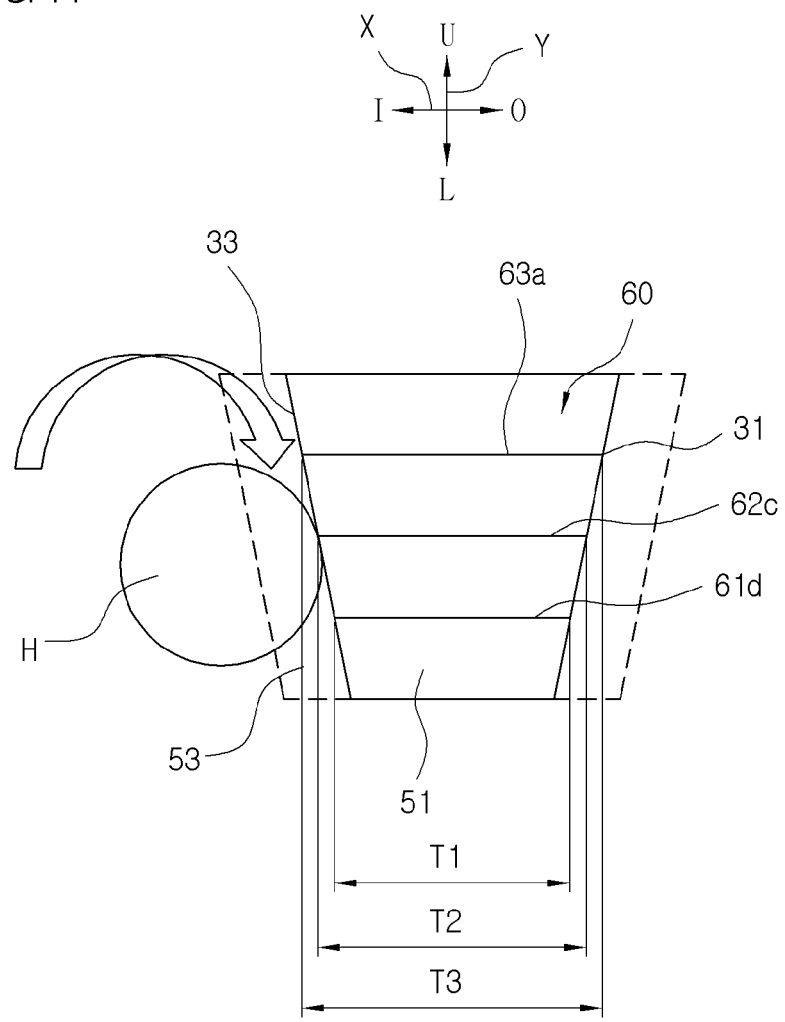
FIG. 14 is a cross-sectional view taken along line IX-IX of FIG. 12.

FIG. 14 is a cross-sectional view taken along line IX-IX of FIG. 12.

Referring to FIGS. 12 and 14, the front chamber C3 of the curtain airbag 30 includes a thickness adjustment unit 60 provided between the inner panel 33 and the outer panel 31 to adjust the expansion thickness along the upper and lower directions U and L and the width directions I and O of the vehicle so that the occupant's head H is prevented from moving toward the front F of the vehicle and rotating about the Z-axis and the X-axis of the vehicle.

The thickness adjustment unit 60 may be implemented by a plurality of tether members arranged between the inner panel 33 and the outer panel 31 to define the anti-X-axis rotation region 51 for preventing the occupant's head H from rotating about the X-axis, and the anti-Z-axis rotation region 53 for preventing the occupant's head H from rotating about the Z-axis of the vehicle.

The thickness adjustment unit 60 includes at least two tether rows provided between the inner panel 33 and the outer panel 31, and arranged at regular intervals along upper and lower directions U and L of the vehicle. FIG. 2 discloses that the thickness adjustment unit 60 includes three tether rows 61, 62 and 63 (hereinafter, referred to as first to third tether rows). The number of tether rows is not limited thereto and may be modified variously.

For example, the first tether row 61 includes four tether members 61a, 61b, 61c and 61d arranged along the front and rear directions F and R of the vehicle, the second tether row 62 includes three tether members 62a, 62b and 62c arranged along the front and rear directions F and R, and the third tether row 63 includes a single tether member 63a.

The length T1 of the tether members 61a, 61b, 61c and 61d arranged in the first tether 61 in the width direction of the vehicle is shorter than the length T2 of the tether members 62a, 62b and 62c arranged in the second tether 62 in the width direction of the vehicle, and the length T2 of the tether members 62a, 62b and 62c arranged in the second tether 62 in the width direction of the vehicle is shorter than the length T3 of the tether member 63a arranged in the third tether 63 in the width direction of the vehicle.

According to one embodiment of the present invention, the lengths of the tether members 61a, 61b, 61c and 61d arranged in the first tether row 61, the tether members 62a, 62b and 62c arranged in the second tether row 62, and the tether member 63a arranged in the third tether row 63 in the front and rear directions F and R of the vehicle may be the same. In another embodiment of the present invention, lengths of the tether members arranged in the first to third tether rows 61, 62 and 63 along the front and rear directions F and R of the vehicle are different from each other, and the number of tether members arranged in each tether row may be modified variously.

According to the above configuration, the expansion thickness of a portion of the head chamber C3 of the airbag 30 gradually increases toward the upper portion U of the vehicle, so that the occupant's head H may be blocked from rotating about the X-axis.

According to one embodiment of the present invention, leading end positions of the tether members arranged in each tether row may be closer to a front end of the airbag 30 as the leading end positions are arranged lower.

In other words, the front end of the tether member 61a of the first tether row 61 is closer to the front end of the airbag 30 relative to the front end of the tether member 62a of the second tether 62, and the front end of the tether member 62a of the second tether row 62 is closer to the front end of the airbag 30 relative to the front end of the tether member 63a of the second tether 62.

According to the above configuration, the ant-Z-axis rotation region 53, which is inclined toward the rear and upper portions R and U of the vehicle, is formed in a front of the anti-X-axis rotation region 51 defined by the first to third tether rows 61, 62 and 63. Accordingly, upon vehicular collision, the X-axis rotation and the Z-axis rotation of the occupant's head H may be simultaneously prevented.

In one embodiment of the present invention, the tether members arranged in the first to third tether rows 61, 62 and 63 may be integrally manufactured with the inner panel 33 and the outer panel 31 by the one-piece woven scheme when the inner panel 33 and the outer panel 31 of the airbag 30 are woven. In another embodiment of the present invention, the tether members arranged in the first to third tether rows 61, 62 and 63 may be provided, for example, as band-shaped members provided separately from the inner panel 33 and the outer panel 31, in which both ends of the band-shaped member may be connected to the inner and outer panels 33 and 31 through the sewing line and the like, respectively.

Figure 15:
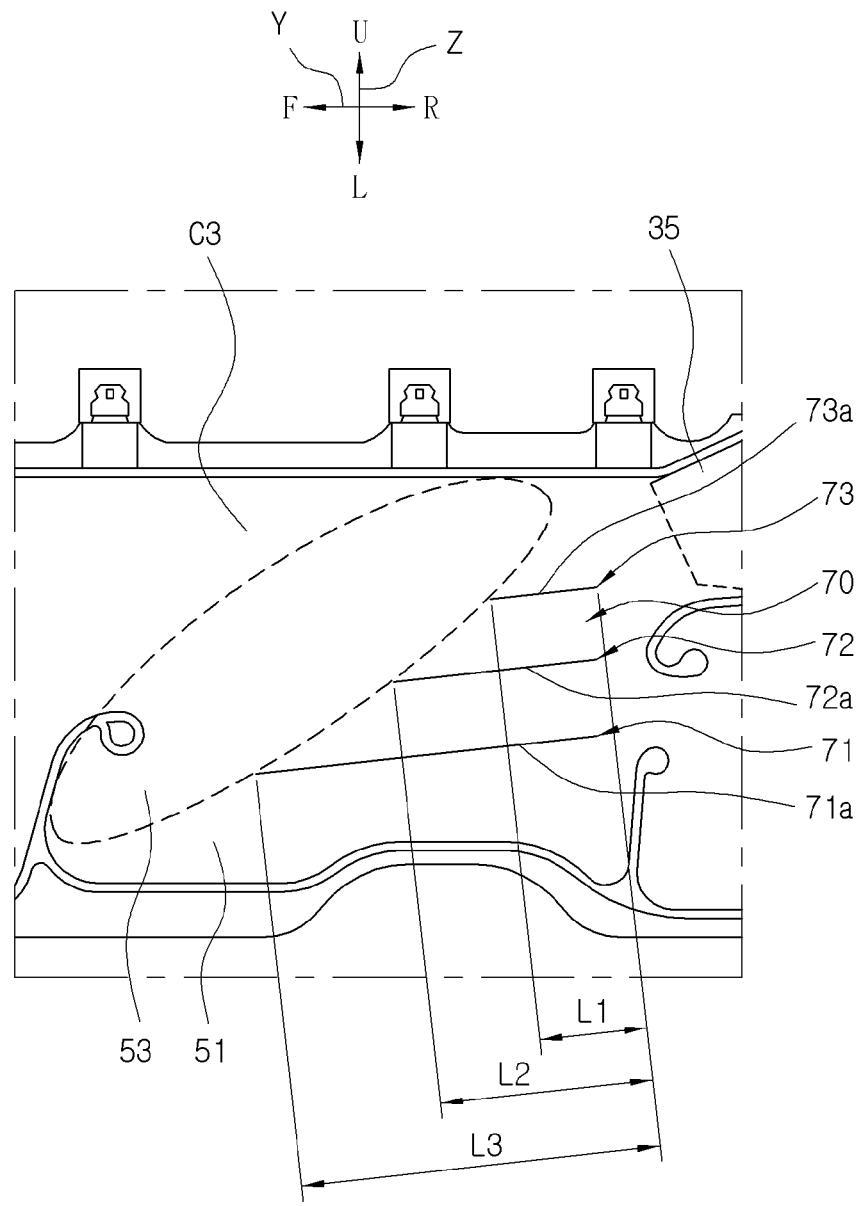
FIG. 15 is a partial side view showing a configuration of another thickness adjustment unit of an airbag according to the present invention.

FIG. 15 is a partial side view showing a configuration of another thickness adjustment unit of the airbag according to the present invention.

The first to third tether rows 71, 72 and 73 of the thickness adjustment unit 70 include single tether members 71a, 71b and 71c, respectively.

A length of the tether member 71a of the first tether row 71 in the width direction of the vehicle is shorter than a length of the tether member 72a of the second tether row 72 in the width direction of the vehicle, and a length of the tether member 72a of the second tether row 72 in the width direction of the vehicle is shorter than a length of the tether member 73a of the third tether row 73 in the width direction of the vehicle. Accordingly, the anti-X-axis rotation region 51 is formed to have the expansion thickness increasing toward the upper part U of the vehicle.

The length L1 of the tether member 71a of the first tether row 71 in the front and rear directions F and R of the vehicle is greater than the length L2 of the tether member 72a of the second tether row 72 in the front and rear directions F and R of the vehicle, and the length L2 of the tether member 72a of the second tether row 72 in the front and rear directions of the vehicle is greater than the length L3 of the tether member 73a of the third tether row 73 in the front and rear directions of the vehicle.

The rear ends of the tether members 71a, 72a and 73a are arranged at the same position in the front and rear directions F and R of the vehicle, so that the front end of the tether member 71a of the first tether row 71 further protrudes toward the front of the vehicle relative to the front end of the tether member 72a of the second tether row 72, and the tether member 72a of the second tether row 72 further protrudes toward the front of the vehicle relative to the front end of the tether member 73a of the third tether row 73. As a result, the anti-Z-axis rotation region 53, which has an upwardly inclined expansion thickness formed toward the rear R of the vehicle, is formed in a front of the anti-X-axis rotation region 51 defined by the tether members 71a, 72a and 73a of the first to third tether rows 71, 72 and 73.

The above-described tether members 71a, 72a and 73a may be arranged to be upwardly inclined toward the rear R of the vehicle. According to the above configuration, the gas introduced through a gas inlet 36 inclined at a predetermined angle with respect to the upper wall 32b of the airbag 30 may be guided to be introduced smoothly.

Figure 16:
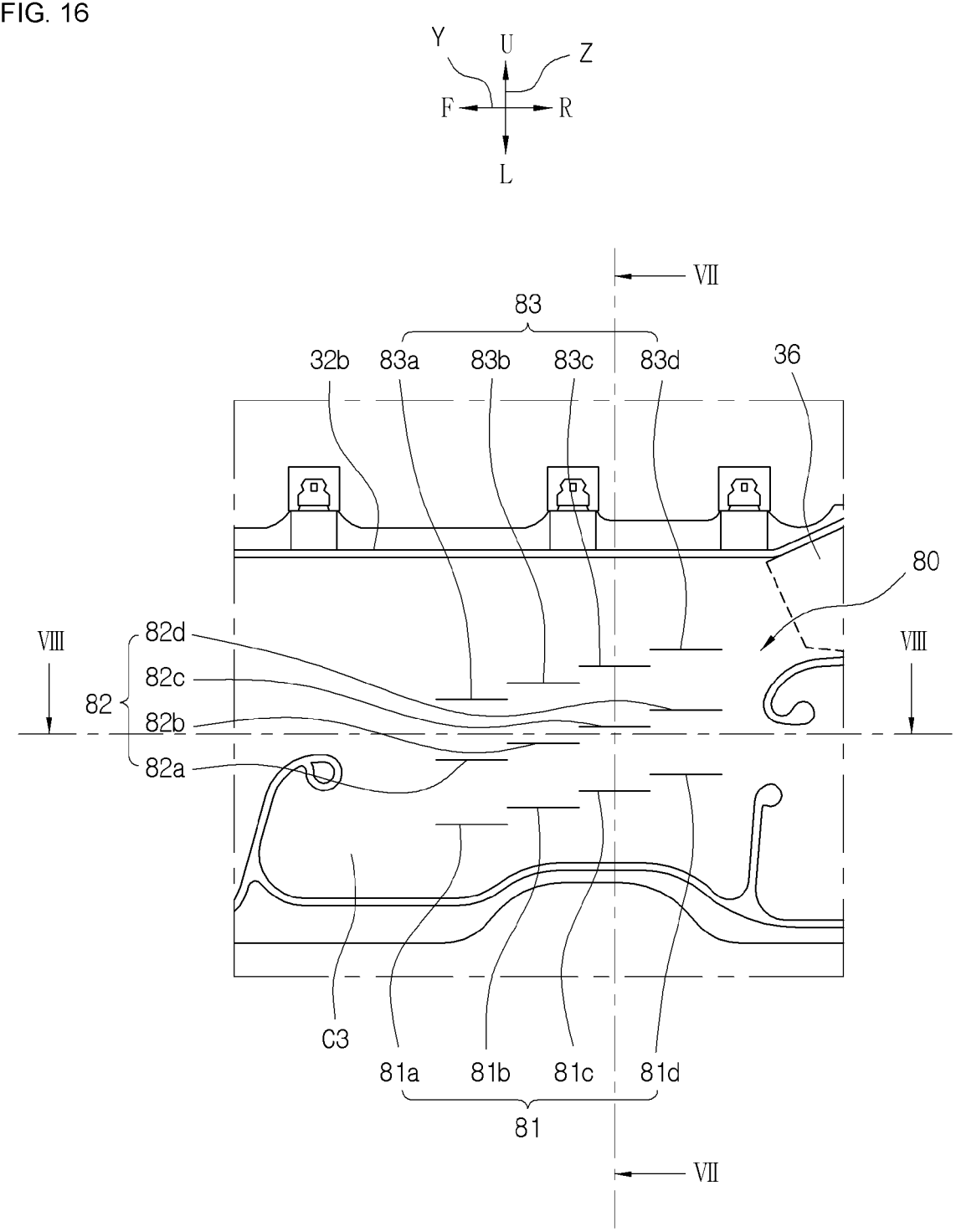
FIG. 16 is a partial side view showing a configuration of still another thickness adjustment unit of an airbag according to the present invention.

FIG. 16 is a partial side view showing a configuration of still another thickness adjustment unit of the airbag according to the present invention.

Referring to FIG. 16, the thickness adjustment unit 80 defines the expansion thickness of the chamber C3 of the airbag 30 to increase toward the upper portion U of the vehicle, and defines the expansion thickness to increase toward the front F of the vehicle, so that the X-axis rotation and the Z-axis rotation of the occupant's head are simultaneously prevented.

The thickness adjustment unit 80 includes at least two tether rows provided between the inner panel 33 and the outer panel 31 and arranged at regular intervals along upper and lower directions of the vehicle. The thickness adjustment unit 80 including the first to third tether rows 81, 82 and 83 is shown in the drawing.

Each of the first, second, and third tether rows 81, 82 and 83 includes a plurality of tether members. For example, the first tether row 81 includes four tether members 81a, 81b, 81c and 81d, the second tether row 82 includes four tether members 82a, 82b, 82c and 82d, and the third tether row 83 includes four tether members 83a, 83b, 83c and 83d. The number of the tether rows and the number of tether members included in each tether column are not limited thereto and may be modified variously.

The tether members arranged in the first, second, and third tether rows 81, 82 and 83 are arranged closer to the upper wall 32b of the airbag 30 as arranged toward the rear R of the vehicle.

In other words, the tether members 81a, 81b, 81c and 81d included in the first tether row 81, the tether members 82a, 82b, 82c and 82d of the second tether row 82, and the tether members 83a, 83b, 83c and 83d of the third tether row 83 may be arranged to have a stepped shape upwardly increasing toward the rear R of the vehicle to form an inclined flow path. According to the above configuration, the gas introduced from the gas inlet 36 may smoothly flow into the airbag 30.

Figure 17:
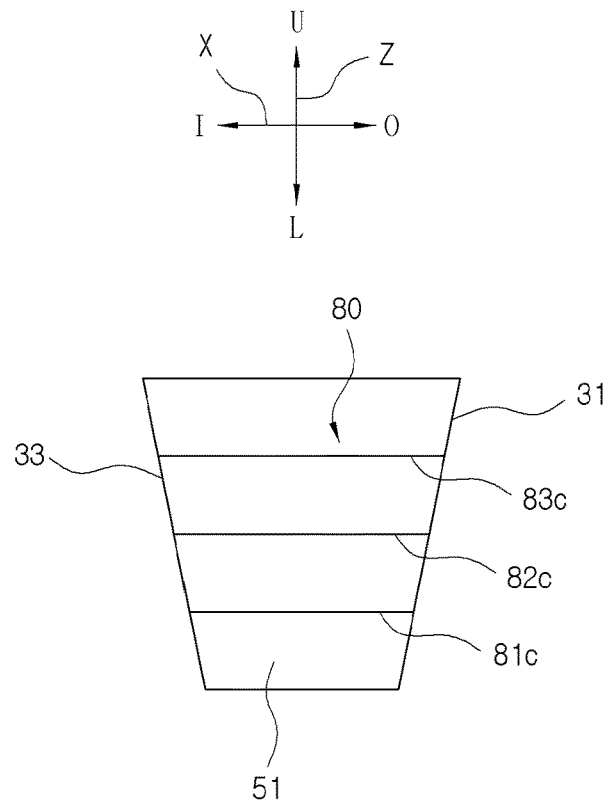
FIG. 17 is a longitudinal sectional view taken along line VII-VII of FIG. 16.
Figure 18:
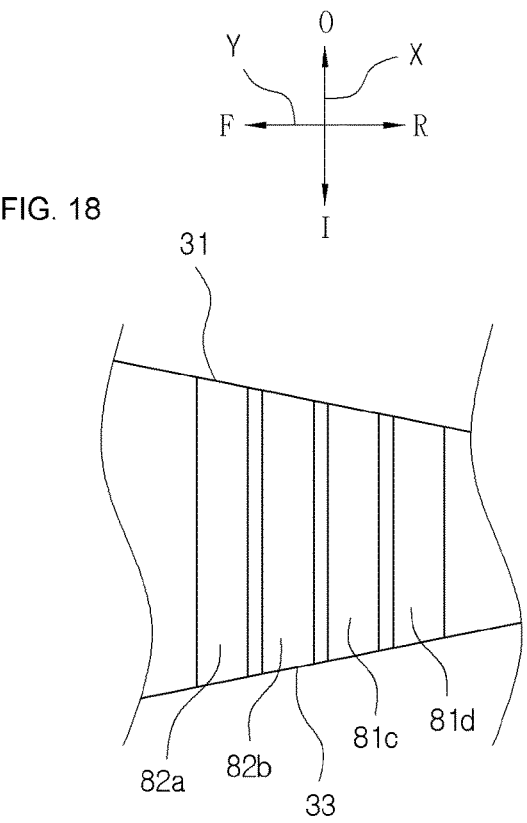
FIG. 18 is a cross-sectional view taken along line VIII-VIII of FIG. 16.

FIG. 17 is a longitudinal sectional view taken along line VII-VII of FIG. 16, and FIG. 18 is a cross-sectional view taken along line VIII-VIII of FIG. 16.

Referring to FIGS. 17 and 18, the lengths of the tether members arranged in each of the first, second and third tether rows 81, 82 and 83 in the width direction of the vehicle increase toward the upper portion U of the vehicle, and increase toward the front F of the vehicle, so that the X-axis rotation and the Z-axis rotation of the occupant's head can be simultaneously prevented.

When the inner panel 33 and the outer panel 31 of the curtain airbag 30 are manufactured, the above-described thickness adjustment units 60, 70 and 80 may be woven together with the inner and outer panels 33 and 31 by the one-piece woven scheme. In other words, the thickness adjustment unit 60, 70 and 80 may be integrally formed with the inner and outer panels 33 and 31 by using warps or wefts for the inner and outer panels 33 and 31 when the inner panel 33 and the outer panel 31 are woven, or may be integrally formed with the inner and outer panels 33 and 31 by applying additional yarns to the warps or wefts constituting the inner and outer panels 33 and 31.

Figure 19:
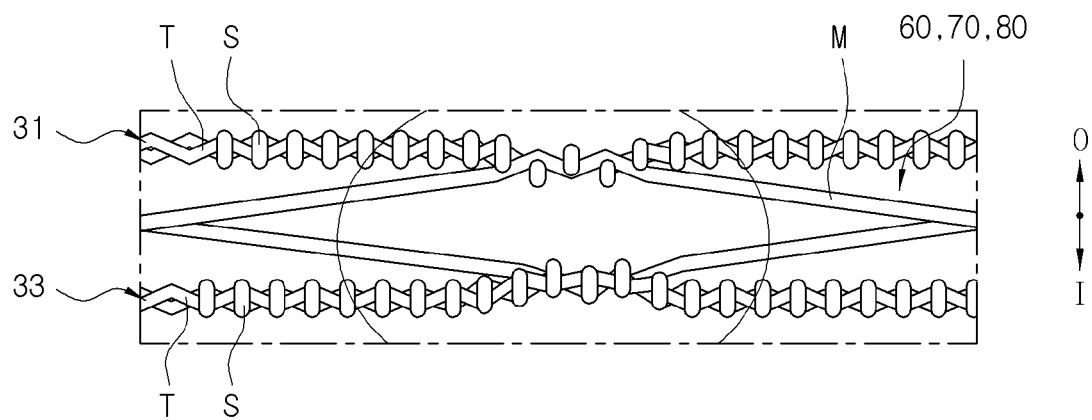
FIG. 19 is a partial side view showing a configuration of another thickness adjustment unit of an airbag according to the present invention.

FIG. 19 is a partial side view showing a configuration of another thickness adjustment unit of the airbag according to the present invention.

Referring to FIG. 19, the inner panel 33 constitutes a woven layer formed by warps T and wefts S, and the outer panel 31 constitutes a woven layer formed by warps T and wefts S. The additional grey yarns M are woven by a predetermined distance into the inner panel 33 along the warps T or wefts S direction of the inner panel 33, and woven into the outer panel 31 by a predetermined distance along the warps T or wefts S direction after extending to the outer panel 31. After the above process is repeated, the thickness adjustment units 60, 70 and 80 are woven together with the inner and outer panels 33, 31 between the inner and outer panels 33, 31. FIG. 9 shows the grey yarn M woven in the warp T direction.

Figure 20:
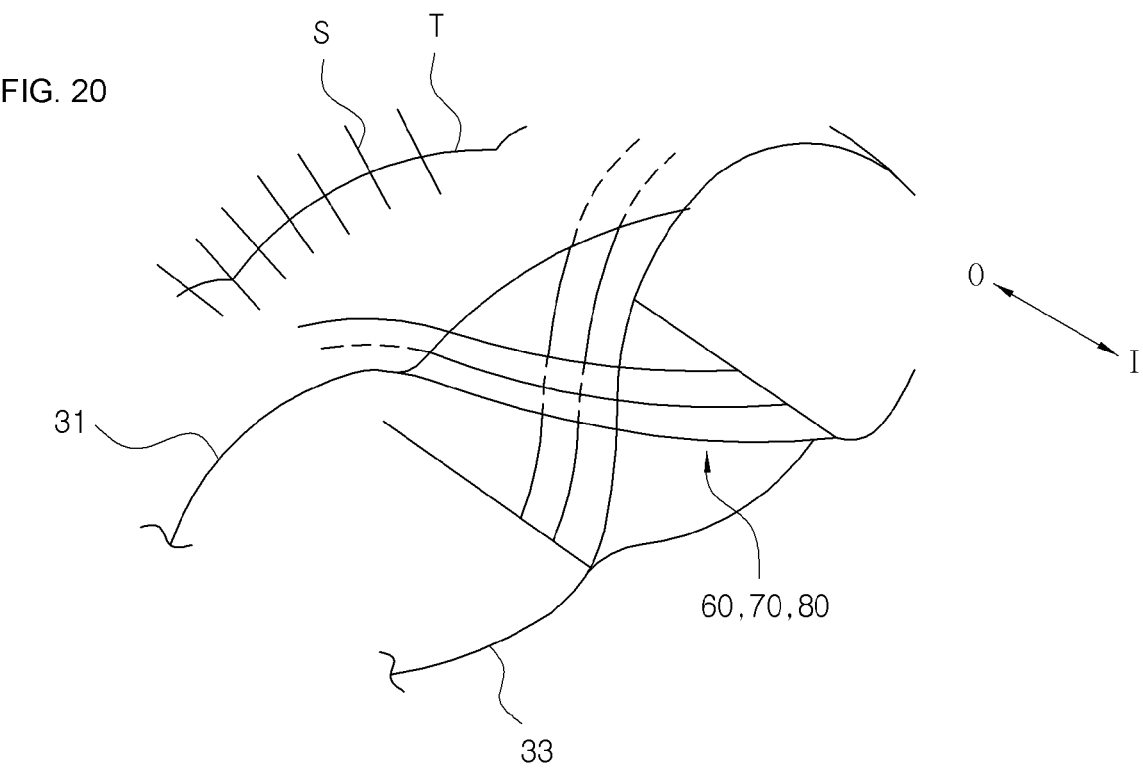
FIG. 20 is a partial side view showing a configuration of another thickness adjustment unit of an airbag according to the present invention.

FIG. 20 is a partial side view showing a configuration of another thickness adjustment unit of the airbag according to the present invention.

Referring to FIG. 20, the warps T and the wefts S leave a surface region formed by the inner panel 33, grow toward the outer panel 31, and are connected to the warps or wefts constituting the outer panel 31, so that the thickness adjustment units 60, 70 and 80 may be integrally formed with the inner panel 33 and the outer panel 31. The above drawing shows that the warp T of the thickness adjustment units 60, 70 and 80 leaves the surface of the inner panel 33 and enters the outer panel 31.

The thickness adjustment units 60, 70 and 80 may be integrally formed with the inner and outer panels 33 and 31 between the inner and outer panels 33 and 31 by various weaving schemes other than the above-described scheme.

The above-mentioned tether members include throughholes through which the gas passes to enable the gas supplied into the airbag 30 to smoothly flows, so that the airbag 30 may be inflated and deployed quickly.

Although the present invention has been described with reference to the accompanying drawings and the preferred embodiments described above, the present invention is not limited thereto but is limited by the following claims. Accordingly, it will be understood by those skilled in the art that various modifications and deformations may be made without departing from the spirit and scope of the appended claims.

INDUSTRIAL APPLICABILITY

The present invention may be applicable to a curtain airbag technology of a vehicle to prevent a head of an occupant from colliding with the airbag and rotating while moving toward a front and an outer side of the vehicle upon collision of the vehicle.

The invention claimed is:

1. A curtain airbag of a vehicle, which is provided in a folded state adjacent to a roof of the vehicle and deployed downward between an inner lateral side of the vehicle and an occupant upon collision of the vehicle, the curtain airbag comprising:

an outer panel and an inner panel directed to a lateral side of the vehicle and the occupant, respectively, when inflated; and a head blocking part having an expansion thickness defined by the outer panel and the inner panel and configured to gradually increase toward a front of the vehicle at a portion which comes into contact with a head of the occupant upon the collision of the vehicle, to prevent the head of the occupant from rotatably moving toward the front of the vehicle, wherein the head blocking part is defined by at least two expansion thickness restriction members disposed between the outer panel and the inner panel, the at least two expansion thickness restriction members have a length configured to be gradually increased toward the front of the vehicle.

2. The curtain airbag of claim 1, wherein the at least two expansion thickness restriction members comprise at least one of:
   tether member connected between the outer panel and the inner panel; and
   an inner tether part integrally woven with the outer panel and the inner panel by a one-piece woven scheme when the outer panel and the inner panel are woven.

3. The curtain airbag of claim 1, wherein each expansion thickness restriction member comprises a non-expansion region for defining a first expansion volume of a front portion of the head blocking part to be larger than a second expansion volume of a rear portion of the head blocking part.

4. The curtain airbag of claim 3, wherein the non-expansion region is defined by a sewing line which connects the outer panel and the inner panel.

5. The curtain airbag of claim 4, wherein the sewing line comprises:
   a front sewing line protruding from a lower portion of the curtain airbag to an upper portion of the curtain airbag; and
   a rear sewing line inclined rearward and upward of the curtain airbag from one position of the lower portion of the curtain airbag, which is away rearward from the front sewing line by a predetermined distance, to reach a middle portion along a vertical direction of the curtain airbag.

6. The curtain airbag of the vehicle of claim 5, wherein the rear sewing line has a shape selected from a group consisting of a circular arc shape, a wave shape, and a stair shape.

7. A curtain airbag of a vehicle, which is provided in a folded state adjacent to a roof of the vehicle and downwardly deployed between an inner lateral side of the vehicle and an occupant upon collision of the vehicle, the curtain airbag comprising:
   an outer panel and an inner panel directed to a lateral side of the vehicle and the occupant, respectively, when deployed; and
   a thickness adjustment unit provided between the inner panel and the outer panel to adjust an inflation thickness which is formed in an upper-lower direction and a width direction of the vehicle such that a head of the occupant is prevented from moving toward a front portion of the vehicle and prevented from rotating about an upper-lower axis and a width axis of the vehicle when the head of the occupant collides with a portion of the inner panel due to the collision of the vehicle,
   wherein the thickness adjustment unit defines: an anti-width-axis rotation region which restricts the inflation thickness formed between the inner panel and the outer panel to be gradually increased toward an upper portion of the vehicle such that the head of the occupant is prevented from rotating about the width axis of the vehicle; and an anti-upper-lower-axis rotation region provided in a front portion of the anti-width-axis rotation region and having a first inflation thickness greater than a second inflation thickness of the anti-width-axis rotation region to prevent the head of the occupant from rotating about the upper-lower axis of the vehicle.

8. The curtain airbag of claim 7, wherein the thickness adjustment unit has at least two tether rows interposed between the inner panel and the outer panel and arranged at a predetermined interval in the upper-lower direction of the vehicle, at least one tether member is provided in each tether row, and the at least one tether member provided in the tether rows has a length formed in the width direction of the vehicle and gradually increased toward the upper portion of the vehicle.

9. The curtain airbag of claim 8, wherein leading ends of the tether members provided in each tether row are arranged closer to a front end of the airbag as the leading ends of the tether members provided in the each tether row are arranged lower.

10. The curtain airbag of claim 9, wherein a single tether member is provided in each tether row, and front-rear directional lengths of the tether members are gradually increased toward a lower portion of the vehicle.

11. The curtain airbag of claim 8, wherein the tether members provided in each tether row have equal front-rear directional lengths, and a number of the tether members provided in each tether row is gradually increased toward a lower portion of the vehicle.

12. The curtain airbag of claim 8, wherein the at least one tether member provided in each tether row is arranged to be inclined upward toward a rear portion of the vehicle.

13. The curtain airbag of claim 8, wherein the at least one tether member provided in the tether row is formed integrally with the inner and outer panels by a one-piece woven scheme when the inner and outer panels are woven.

14. The curtain airbag of claim 8, wherein the thickness adjustment unit has at least two tether rows interposed between the inner panel and the outer panel and arranged at a predetermined interval in the upper-lower direction of the vehicle, and
   a plurality of tether members provided in the at least two tether rows have lengths formed in the width direction of the vehicle and gradually increased toward the upper portion and the front portion of the vehicle.

15. The curtain airbag of claim 14, wherein the tether members provided in the tether rows are arranged closer to an upper wall of the curtain airbag as the tether members provided in the tether rows are arranged at a lower portion of the vehicle.

16. The curtain airbag of claim 14, wherein the tether members provided in the tether rows are formed integrally with the inner and outer panels by a one-piece woven scheme when the inner and outer panels are woven.

17. The curtain airbag of claim 7, wherein the thickness adjustment unit restricts the inflation thickness formed between the inner panel and the outer panel to be gradually increased toward an upper portion of the vehicle such that the head of the occupant is prevented from rotating about the width axis of the vehicle, and restricts the inflation thickness formed between the inner panel and the outer panel to be gradually increased toward the front portion of the vehicle such that the head of the occupant is prevented from rotating about the upper-lower axis of the vehicle.

18. A curtain airbag for a vehicle, the curtain airbag comprising:
   an outer panel and an inner panel defining first and second lateral sides of the curtain airbag, respectively; and
   a head blocking part having an expansion thickness upon inflation of the curtain airbag, the expansion thickness defined by the outer panel and the inner panel and configured to gradually increase toward a front end of the curtain airbag,
   wherein the head blocking part is defined by at least two expansion thickness restriction members disposed between the outer panel and the inner panel, the at least two expansion thickness restriction members each having a length that increases toward the front of the curtain airbag, and wherein the curtain airbag has a length extending between the front end and a rear end and a height perpendicular to the length the length being greater than the height.

19. The curtain airbag of claim 18, wherein the at least two expansion thickness restriction members include at least first and second tether members both connected with the outer panel and the inner panel.

* * * * *